United States Patent Office 2,733,241
Patented Jan. 31, 1956

2,733,241

BASIC DERIVATIVES OF SUBSTITUTED CYCLOPROPANECARBOXYLIC ACIDS AND METHODS OF PREPARING SAME

John Krapcho, New Brunswick, and William A. Lott, Maplewood, N. J., assignors to Olin Mathieson Chemical Corporation, New York, N. Y., a corporation of Virginia No Drawing. Application March 7, 1952,
Serial No. 275,468

12 Claims. (Cl. 260—247.1)

This invention relates to, and has for its object, the provision of: (A) bases of the general formula $$R-\underset{\underset{R^1}{|}}{\overset{\overset{OH}{|}}{C}}-\underset{R^4-CH-CH-R^4}{\overset{}{C}}-COO-(lower\ alkylene)-N\overset{R^2}{\underset{R^3}{\diagdown}}$$

wherein R is a member of the class consisting of aryl and heterocyclic groups; $R^1$ is a member of the class consisting of alkyl, cycloalkyl, aryl and heterocyclic groups; each $R^4$ is a member of the class consisting of hydrogen and lower alkyl groups; and $$-N\overset{R^2}{\underset{R^3}{\diagdown}}$$

is a member of the class consisting of $$-N\overset{(lower\ alkyl)}{\underset{(lower\ alkyl)}{\diagdown}}$$

1-piperidyl, 1-pyrrolidyl and 4-morpholinyl groups; (B) acid-addition salts thereof; (C) quaternary ammonium salts thereof; and (D) methods of preparing (A), (B) and (C). [The aryl, heterocyclic and cycloalkyl groups mentioned hereinbefore may be unsubstituted or may contain substituents as alkyl, alkoxy, hydroxy and halogen groups.]

These compounds are useful and advantageous therapeutic agents, especially antispasmodics. Thus, the hydrochloride of 2-diethylaminoethyl 1-(α-hydroxybenzohydryl)cyclopropanecarboxylate, a compound representative of group B, defined hereinbefore, may be administered in the same general manner (e. g., orally in tablet form) for the same general purpose (e. g., for reduction of rigidity in Parkinson's disease) and with the same general results as the hydrochloride of 2-diethylaminoethyl 1-phenylcyclopropanecarboxylate, an antispasmodic widely used and accepted by the medical profession.

This invention also includes acids (E) of the general formula $$R-\underset{\underset{R^1}{|}}{\overset{\overset{OH}{|}}{C}}-\underset{R_4-CH-CH-R^4}{\overset{}{C}}-COOH$$

wherein R and $R^1$ and $R^4$ have the meaning given hereinbefore, these acids being useful intermediates for the preparation of compounds of this invention, as well as for the preparation of the corresponding amides.

Among the preferred compounds are: acid-addition salts of the basic derivatives, wherein each of R and $R^1$ is a phenyl group; and the corresponding quaternary ammonium salts thereof with alkyl halides.

The acids (E) of this invention may be prepared conveniently by the method essentially comprising interacting an acid (I) of the general formula $$R-CO-\underset{R^4-CH-CH-R^4}{\overset{}{C}}-COOH$$

with a Grignard reagent derived from the appropriate $R^1$-halogen (II) in an organic solvent for the reactants (such as ether, dibutyl ether, tetrahydrofuran). Examples of reactants utilizable for the foregoing include, inter alia:

1-benzoylcyclopropanecarboxylic acid
1-(2-thenoyl)cyclopropanecarboxylic acid
1-(p-hydroxybenzoyl)cyclopropanecarboxylic acid
1-(2-furoyl)cyclopropanecarboxylic acid
1-anisoylcyclopropanecarboxylic acid
1-(o-toluyl)cyclopropanecarboxylic acid
1-(p-chlorobenzoyl)cyclopropanecarboxylic acid
1-(3-thenoyl)cyclopropanecarboxylic acid
1-(o-chlorobenzoyl)cyclopropanecarboxylic acid
1-(5-methyl-2-thenoyl)cyclopropanecarboxylic acid
1-benzoyl-2-methylcyclopropanecarboxylic acid
1-benzoyl-2-propylcyclopropanecarboxylic acid The Grignard reagents may be derived from the following halides (II):

Ethyl bromide
Allyl chloride
Benzyl chloride
Cyclopentyl bromide
Cyclohexyl bromide
α-Thenyl bromide
p-Xenyl bromide
p-Methoxybenzyl chloride
α-Naphthyl bromide
Phenyl bromide
3-bromopyridine Bases (A) are prepared by the method which essentially comprises interacting acids E (which may be in their alkali-metal salt form) with basic aliphatic halides (IV) of the general formula $$halogen-(lower\ alkylene)-N\overset{R^2}{\underset{R^3}{\diagdown}}$$

in an organic solvent for the reactants (preferably isopropyl alcohol), removing the solvent and recovering the residue.

The utilizable basic aliphatic halides IV include, inter alia:

2-diethylaminoethyl chloride
3-diethylaminopropyl chloride
3-(1-piperidyl)-propyl chloride
2-(1-pyrrolidyl)-ethyl chloride
2-(4-morpholinyl)-ethyl chloride
3-diethylamino-2,2-dimethylpropyl chloride
2-(1-piperidyl)-ethyl chloride
2-diethylaminoisopropyl chloride
2-dimethylaminoethyl chloride
2-dipropylaminoethyl chloride In the above method the bases may be obtained as such (i. e., as the free base) or in the form of their acid-addition salts (as hydrochlorides, if the halogen in the reactant is chlorine). The acid-addition salts may be converted to the free base in the conventional manner, i. e., by neutralization with alkali; and the free base may be converted to other acid-addition salts by reacting the base with the desired acid in a suitable solvent. The utilizable acids comprise: hydrobromic, boric, nitric, lactic, tartaric, citric, succinic, phosphoric, sulfuric, maleic, fumaric and (especially) hydrochloric, inter alia.

By the addition of alkyl halides (such as ethyl bromide, methyl bromide), dialkyl sulfates (such as diethyl sulfate), aryl halides (such as benzyl chloride), or the like, there are obtained in the usual manner quaternary salts of the aforesaid bases (A).

As indicated hereinbefore, the acids of the invention are useful in the preparation of corresponding amides, i. e.,

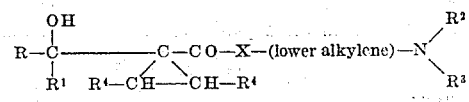

wherein X is a member of the class consisting of NH and N(alkyl) groups, and R, R¹, R⁴, and

have the meaning given hereinbefore. Thus, neutral esters,

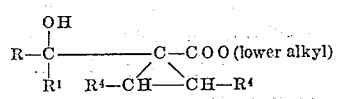

prepared from the acids (E) of the invention, are interacted with a diamine containing at least one free amino hydrogen. For example, ethyl 1-(α-hydroxybenzohydryl)cyclopropanecarboxylate, prepared from the acid described in Example 1(a), interacted with N,-N-diethylethylenediamine, yields 2 - diethylaminoethyl - 1 - (α-hydroxybenzohydryl)cyclopropanecarboxamide.

The following examples are illustrative of the invention:

EXAMPLE 1

*Preparation of 2-diethylaminoethyl 1-(α-hydroxybenzohydryl)cyclopropanecarboxylate, and the hydrochloride thereof*

(a) *1-(α-hydroxybenzohydryl)cyclopropanecarboxylic acid.*—A solution of phenylmagnesium bromide (prepared by the dropwise addition of a solution of 94.2 g. bromobenzene in 200 ml. ether to a cooled suspension of 14.4 g. magnesium turnings) is added dropwise (over a fifteen minute period) to a cooled slurry of 38.0 g. 1-benzoylcyclopropanecarboxylic acid [J. C. S. 47, 836 (1885)] in 250 ml. ether; the gray precipitate, which eventually forms, becomes gummy. The mixture is stirred for one hour at room temperature, refluxed for two hours and then cooled; and when triturated several times with ether the heavy oil changes to a gray granular precipitate. This precipitate is added to a cold solution of 15 ml. concentrated sulfuric acid in 300 ml. water; the liberated acid is dissolved in ether and the ether phase is washed first with 100 ml. water and then with a solution of 12.0 g. sodium hydroxide in 150 ml. water. The alkaline mixture is acidified with a solution of 10 ml. concentrated sulfuric acid in 100 ml. water and the free acid is extracted with ether. After drying over magnesium sulfate, the ether is evaporated and the damp solid is suspended in hexane and filtered, yielding about 44 g. of product, 1-(α-hydroxybenzohydryl)cyclopropanecarboxylic acid, M. P. about 177° C. (dec.). After crystallization from isopropyl alcohol, the colorless product melts at about 181° C. (dec.).

(b) A mixture of 30.0 g. 1-(α-hydroxybenzohydryl)cyclopropanecarboxylic acid, prepared as described in (a), 15.2 g. 2-diethylaminoethyl chloride and 350 ml. dry isopropyl alcohol is refluxed for fifteen hours, cooled, and the solvent is removed by distillation under reduced pressure. The cooled residue is dissolved in 150 ml. water and treated with a solution of 6.0 g. sodium hydroxide in 50 ml. water. The liberated free base is taken up in ether, dried over magnesium sulfate, and the ether evaporated, yielding a colorless residue, the free basic ester 2-diethylaminoethyl 1-(α-hydroxybenzohydryl)cyclopropanecarboxylate, weighing about 37 g.

(c) The free basic ester, dissolved in dry ether, is treated with a slight excess of ethereal hydrogen chloride to yield about 40 g. of the hydrochloride of the base; the acid-addition salt is a colorless precipitate melting at about 149–151° C. After recrystallization from butanone the crystalline product melts at about 154–155° C. On repeated recrystallization the product apparently changes to another form, which is gelatinous and which melts at about 174–175° C. (Attempts at recrystallization of the latter gelatinous product from isopropyl alcohol produces no additional change.)

EXAMPLE 2

*Preparation of 2 - diethylaminoethyl 1 - (α - hydroxy-α-phenyl-2-thenyl)cyclopropanecarboxylate*

(a) *Ethyl 1-(2-thenoyl)cyclopropanecarboxylate.*—To a cooled solution of sodium ethoxide, prepared from 6.7 g. of sodium and 100 ml. absolute ethanol, is added dropwise a mixture of 57.0 g. ethyl 2-thenoyl-acetate [J. Amer. Chem. Soc., 66, 1768 (1944)] and 54.5 g. ethylene bromide; and the mixture is refluxed for six hours. After cooling, the mixture is treated with a solution of 5.0 g. sodium in 100 ml. ethanol and the material is then refluxed for five hours, cooled and diluted with 500 ml. water. The resulting solution is extracted with ether and the ethereal phase washed several times with water until the aqueous phase is neutral. The ether phase is dried over magnesium sulfate, filtered and solvent evaporated. Distillation of the residue yields about 23.8 g. of the ester, ethyl 1-(2-thenoyl)cyclopropanecarboxylate; B. P. about 127–130° C./4 mm.; $n_D^{23}$=1.5434.

(b) *1-(2-thenoyl)cyclopropanecarboxylic acid.*—Part of the above ester (22.9 g.) is added to a solution of 23 g. of potassium hydroxide in 300 ml. of 95% alcohol and the resulting solution refluxed for two hours. After cooling, the mixture is diluted with 500 ml. of water and then extracted several times with ether. The aqueous phase is acidified with dilute sulfuric acid and the resulting liberated acid extracted with ether. After drying over magnesium sulfate, the solvent is evaporated and the residue crystallized as long blade-like crystals. This material is suspended in hexane and filtered; yield about 12 g., M. P. about 135–138° C. After crystallization from 50% alcohol, the 1-(2-thenoyl)cyclopropanecarboxylic acid weighs about 9.5 g., M. P. about 139–141° C. (with evolution of a gas).

(c) *1 - (α - hydroxy-α - phenyl - 2 - thenyl)cyclopropanecarboxylic acid.*—Using a molar equivalent of 1-(2-thenoyl)cyclopropanecarboxylic acid in place of 1-benzoylcyclopropanecarboxylic acid in Example 1(a), 1 - (α - hydroxy-α-phenyl-2-thenyl)cyclopropanecarboxylic acid is obtained.

(d) Using a molar equivalent of the acid prepared in the above example in place of 1-(α-hydroxybenzohydryl)cyclopropanecarboxylic acid in Example 1(b), 2-diethylaminoethyl 1 - (α - hydroxy - α - phenyl - 2 - thenyl)cyclopropanecarboxylate is obtained.

EXAMPLE 3

Using a molar equivalent of ethylmagnesium bromide in place of phenylmagnesium bromide in Example 1(a), the correspondingly substituted acid and ultimately the free basic ester, 2-diethylaminoethyl 1-(α-ethyl-α-hydroxybenzyl)cyclopropanecarboxylate (and salt thereof) is obtained.

EXAMPLE 4

Using molar equivalents of 3-dimethylaminopropyl chloride and 2-(1-piperidyl)ethyl chloride in place of 2-diethylaminoethyl chloride in Example 1(b) yields 3-dimethylaminopropyl 1 - (α - hydroxybenzohydryl)cyclopropanecarboxylate and 2 - (1 - piperidyl)ethyl 1-

(α - hydroxybenzohydryl)cyclopropanecarboxylate (and salts thereof), respectively.

EXAMPLE 5

A solution of 5.0 g. 2-diethylaminoethyl 1-(α-hydroxybenzohydryl)cyclopropanecarboxylate, prepared as described in Example 1(b), in 25 ml. acetone is treated with a solution of 3.0 g. methylbromide in 50 ml. acetone, yielding the methobromide of 2-diethylaminoethyl 1-(α-hydroxybenzohydryl)cyclopropanecarboxylate.

EXAMPLE 6

*Preparation of 2-diethylaminoethyl 1-(α-hydroxybenzohydryl)-2-methylcyclopropanecarboxylate, and the hydrochloride thereof*

(a) *1-(α-hydroxybenzohydryl)-2-methylcyclopropanecarboxylic acid.*—Using a molar equivalent of 1-benzoyl-2-methylcyclopropanecarboxylic acid [J. C. S. 61, 83 (1892)], in place of 1-benzoylcyclopropanecarboxylic acid in Example 1(a), 1-(α-hydroxybenzohydryl)-2-methylcyclopropanecarboxylic acid is prepared.

(b) Using a molar equivalent of this acid in place of 1-(α-hydroxybenzohydryl)cyclopropanecarboxylic acid in Example 1(b), the corresponding free basic ester (and salt thereof) is obtained.

The invention may be variously otherwise embodied within the scope of the appended claims.

We claim:

1. Compounds of the class consisting of: (A) bases of the general formula

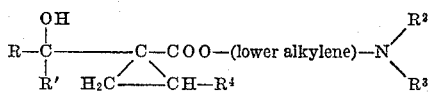

wherein R is a phenyl group, R' is a member of the class consisting of phenyl groups and thienyl groups, R⁴ is a member of the class consisting of hydrogen and lower alkyl, and

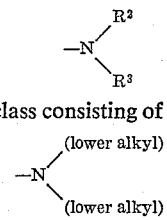

is a member of the class consisting of

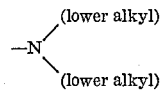

1-piperidyl, 1-pyrrolidyl, and 4-morpholinyl; (B) acid-addition salts thereof, and (C) quaternary ammonium salts thereof.

2. Acids of the general formula:

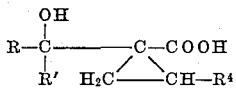

wherein R is a phenyl group, R' is a member of the class consisting of phenyl groups and thienyl groups, and R⁴ is a member of the class consisting of hydrogen and lower alkyl groups.

3. The method which essentially comprises interacting an acid of the general formula:

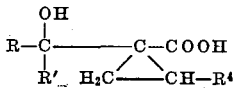

with a basic aliphatic halide of the general formula,

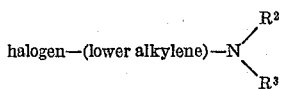

in an organic solvent for the reactants, wherein R is a phenyl group, R' is a member of the class consisting of phenyl groups and thienyl groups, and

is a member of the class consisting of

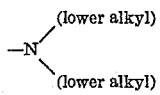

1-piperidyl, 1-pyrrolidyl and 4-morpholinyl groups.

4. An acid-addition salt of a base of the general formula:

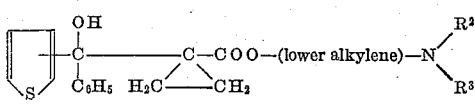

wherein

is a member of the class consisting of

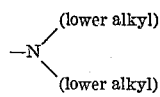

1-piperidyl, 1-pyrrolidyl and 4-morpholinyl groups.

5. An acid-addition salt of a base of the general formula:

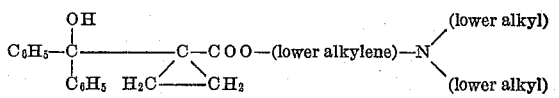

6. An acid-addition salt of 2-diethylaminoethyl 1-(α-hydroxybenzohydryl) cyclopropanecarboxylate.

7. An acid-addition salt of 2-diethylaminoethyl 1-(α-hydroxy-α-phenyl-2-thenyl) cyclopropanecarboxylate.

8. 2-diethylaminoethyl 1-(α-hydroxybenzohydryl) cyclopropanecarboxylate hydrochloride.

9. 2-diethylaminoethyl 1-(α-hydroxy-α-phenyl-2-thenyl) cyclopropanecarboxylate hydrochloride.

10. The methobromide of 2-diethylaminoethyl 1-(α-hydroxybenzohydryl) cyclopropanecarboxylate.

11. 3-dimethylaminopropyl 1-(α-hydroxybenzohydryl) cyclopropanecarboxylate.

12. 2 - diethylaminoethyl 1 - (α - hydroxybenzohydryl)-cyclopropanecarboxylate.

References Cited in the file of this patent

UNITED STATES PATENTS

| | | |
|---|---|---|
| 2,573,015 | Haefliger et al. | Oct. 30, 1951 |
| 2,638,471 | Burger | May 12, 1953 |

OTHER REFERENCES

Mironescu et al.: Chem. Abst., vol. 30, col. 1053 (1936).

Ellingboe: Chem. Abst., vol. 28, col. 6114 (1934).